United States Patent
Krivorot et al.

(10) Patent No.: US 8,774,370 B2
(45) Date of Patent: Jul. 8, 2014

(54) SYSTEM AND METHOD FOR DELIVERING CALLBACK NUMBERS FOR EMERGENCY CALLS IN A VOIP SYSTEM

(75) Inventors: Zohar Krivorot, Hampstead (CA); Avi Krivorot, Côte St-Luc (CA); Lev Deich, Hampstead (CA)

(73) Assignee: Connexon Telecom Inc., Montreal, Quebec (CA)

( * ) Notice: Subject to any disclaimer, the term of this patent is extended or adjusted under 35 U.S.C. 154(b) by 1534 days.

(21) Appl. No.: 11/842,785

(22) Filed: Aug. 21, 2007

(65) Prior Publication Data
US 2008/0063153 A1    Mar. 13, 2008

Related U.S. Application Data

(60) Provisional application No. 60/838,868, filed on Aug. 21, 2006.

(51) Int. Cl.
| H04M 11/00 | (2006.01) |
| H04M 11/04 | (2006.01) |
| H04M 7/00  | (2006.01) |
| H04M 3/51  | (2006.01) |

(52) U.S. Cl.
CPC .............. *H04M 11/04* (2013.01); *H04M 7/006* (2013.01); *H04M 3/5116* (2013.01); *H04M 2242/04* (2013.01)
USPC ............................ 379/45; 379/90.01; 370/352

(58) Field of Classification Search
CPC ............ H04M 11/04; H04M 2242/04; H04M 3/5116; H04M 7/006; H04M 3/42195; H04M 1/72536; H04M 1/2535; H04W 76/007; H04L 12/66

USPC ...................................................... 379/37–51
See application file for complete search history.

(56) References Cited

U.S. PATENT DOCUMENTS

| 6,665,611 | B1 | 12/2003 | Oran et al. |
| 6,678,357 | B2 | 1/2004 | Stumer et al. |
| 6,711,247 | B1 * | 3/2004 | Needham et al. ......... 379/207.14 |
| 6,937,572 | B1 | 8/2005 | Egan et al. |
| 6,968,044 | B2 | 11/2005 | Beason et al. |
| 7,127,044 | B1 * | 10/2006 | Becker et al. .................... 379/45 |
| 2002/0176404 | A1 | 11/2002 | Girard |
| 2003/0063714 | A1 * | 4/2003 | Stumer et al. .................... 379/37 |
| 2004/0192252 | A1 | 9/2004 | Aerrabotu et al. |
| 2005/0083911 | A1 | 4/2005 | Grabelsky et al. |
| 2005/0083912 | A1 | 4/2005 | Afshar et al. |
| 2005/0123102 | A1 | 6/2005 | Beason et al. |
| 2005/0169248 | A1 | 8/2005 | Truesdale et al. |

(Continued)

*Primary Examiner* — Stella Woo
(74) *Attorney, Agent, or Firm* — Merchant & Gould P.C.

(57) ABSTRACT

In a VoIP system, a method and apparatus for tracking emergency callers is provided. A VoIP service provider network includes a plurality of VoIP phones and is connected to an emergency service provider system. The emergency service provider system includes a call server connected to the VoIP service provider network; a subscriber database; a VPC SBC; and a media gateway for connection to a PSTN. The call server is adapted to receive an emergency call from a VoIP telephone in the VoIP network; verify if the SIP URI has a DID bound to the SIP URI; if the SIP URI does not have a DID bound to the SIP URI, obtain a temporary DID from a DID pool and temporarily bind the temporary DID to the SIP URI; and forward the call to an appropriate PSAP in the PSTN. Should the emergency call be dropped, a person at the PSAP can call back the emergency caller without unnecessary delays.

9 Claims, 3 Drawing Sheets

(56) References Cited

U.S. PATENT DOCUMENTS

| | | |
|---|---|---|
| 2006/0067485 A1 | 3/2006 | Beason et al. |
| 2006/0109960 A1 | 5/2006 | D'Evelyn et al. |
| 2006/0187898 A1 | 8/2006 | Chou et al. |
| 2006/0188073 A1 | 8/2006 | Wright |
| 2006/0193447 A1 | 8/2006 | Schwartz |
| 2007/0060097 A1* | 3/2007 | Edge et al. .................. 455/404.1 |
| 2007/0121884 A1* | 5/2007 | Sin et al. ....................... 379/219 |
| 2010/0020942 A1* | 1/2010 | Olshansky et al. ............. 379/45 |

* cited by examiner

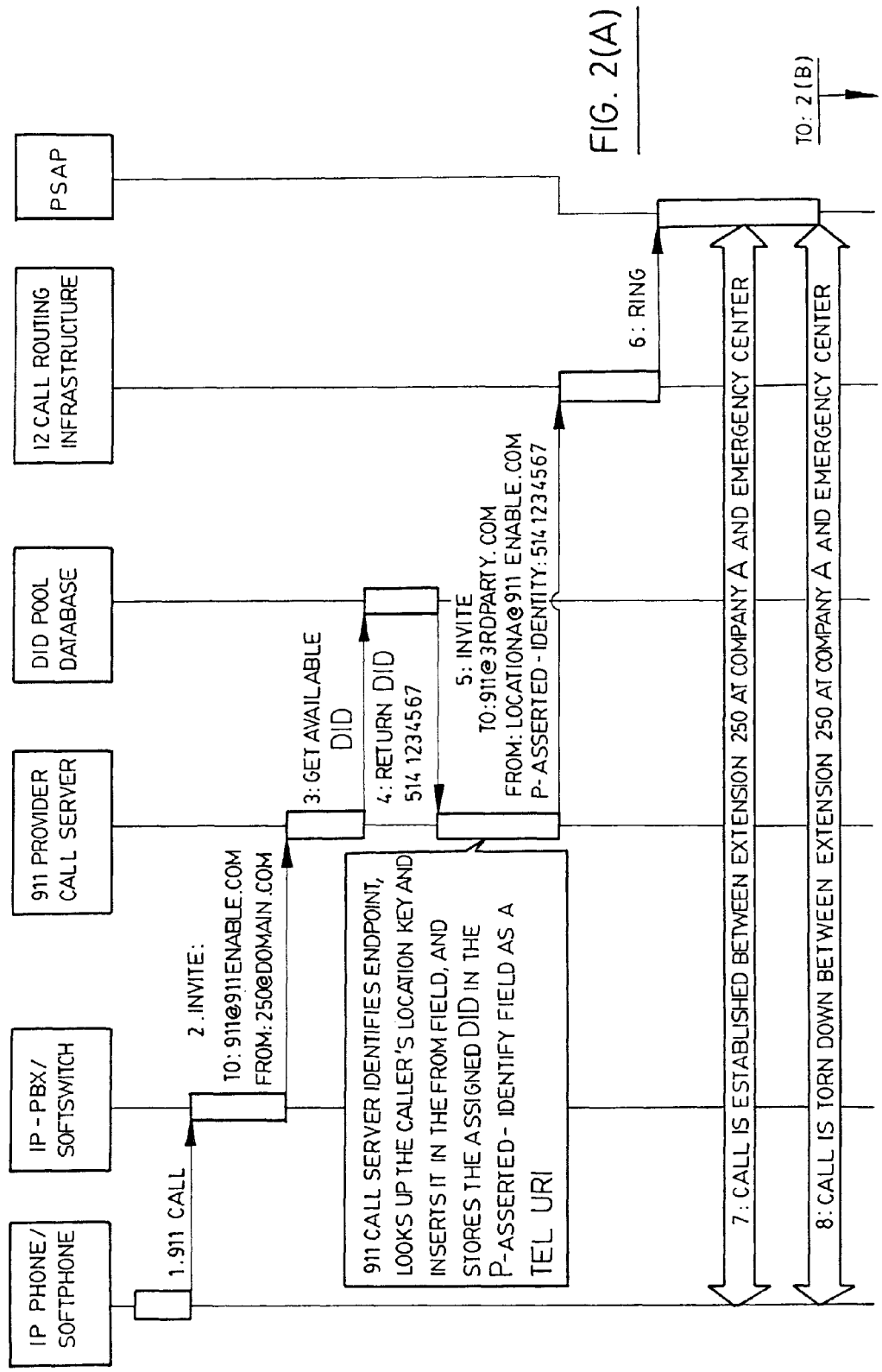

SYSTEM AND METHOD FOR DELIVERING CALLBACK NUMBERS FOR EMERGENCY CALLS IN A VOIP SYSTEM

FIELD OF THE INVENTION

In most areas of the world, a unique number is used to make an emergency call. For North America, this number is "911", and when this number is dialed, the call is automatically routed to a Public Safety Answering Point (PSAP). In the present description, although for simplicity reference is made to a "911" system, a person skilled in the art will appreciate that the present invention is readily applicable to any emergency service provider.

In some cases, an emergency call will be dropped, for any number of reasons. If this occurs, most jurisdictions require that the PSAP be able to call back the person that made the call.

Currently, when a 9-1-1 call is placed by a customer in a VoIP context, a server forwards the call to a 9-1-1 gateway ($3^{rd}$ party call server) which routes the call to the correct Public Safety Answering Point (PSAP) that answers the call. The call delivery is generally done using NENA i1, i2, or i3 standards. The PSAP must be able to call back the caller in case the call is disconnected.

Many VoIP users have a Direct Inward Dial (DID) associated with their phone line. This allows anyone connected to the Public Switch Telephone Network (PSTN) to call the VoIP user. For such users, the 911 system can obtain the caller's callback number from the SIP signaling messages by reading the SIP URI field. The field is in the form DID@provider.com, where the DID is the VoIP user's DID, and the provider.com is the user's domain.

In many cases, it is becoming more common to see VoIP phones without assigned DID numbers. This is often the case in Multi-Line Telephone Systems (MLTS) and peer to peer VoIP service providers. For such users, The SIP URI originating from call will be a phone extension or an alphanumeric username. Since the phone does not have a direct PSTN callback number that can be reached by the PSAP, these users cannot be adequately serviced.

The traditional solution to this problem is to assign a static phone number to the VoIP phone. This solution increases costs to maintain a VoIP phone lines and can be complex to administer in large enterprises.

It is required to route the 9-1-1 calls from the different extensions to the correct PSAPs based on the subscriber location and provide this PSAP with a callback number that can call the extension directly without permanently assigning a DID to each extension.

SUMMARY OF THE INVENTION

An object of the invention is to provide a system and method to deliver a callback number for emergency calls in a VoIP system. To achieve this objective, when an extension makes a call, a DID is selected from a pool and bound to it for a finite duration. This DID is used as the callback number to call the phone extension directly. If the PSAP initiates a callback, the call is originated by the 911 service provider, and translated back to the VoIP phone's SIP address.

More specifically, according to one aspect of the invention, this object is achieved with a method for delivering callback numbers for emergency calls in a VoIP system, comprising the steps of:
  (a) providing a pool of callback numbers consisting of a plurality of individual DIDs;
  (b) providing a plurality of IP phones, each phone being provided with a unique SIP URI;
  (c) at an emergency service provider, temporarily binding a DID to the SIP URI when an emergency call is made from at least one of the phones if the SIP URI is not already bound to a DID; and
  (d) marking the DID that is bound to the SIP URI as unavailable.

In another aspect, the invention provides a method for delivering callback numbers for emergency calls in a VoIP system, comprising temporarily assigning a DID from a pool of DIDs to a VoIP endpoint during a 911 call, the DID mapping a callback number to an IP phone in a VoIP system.

In yet another aspect of the invention, there is provided an emergency service provider system, comprising:
  a call server for connection to a VoIP service provider network;
  a subscriber database;
  a VPC SBC; and
  a media gateway for connection to a PSTN;
  the call server being adapted to:
    receive an emergency call from a VoIP telephone in the VoIP network;
    verify if the SIP URI has a DID bound to the SIP URI;
    if the SIP URI does not have a DID bound to the SIP URI, obtain a temporary DID from a DID pool and temporarily bind the temporary DID to said SIP URI; and
  forward the call to an appropriate PSAP in the PSTN.

DESCRIPTION OF THE DRAWINGS

The present invention will be better understood after reading a description of a preferred embodiment thereof, made in reference to the following drawings in which.

DESCRIPTION OF A PREFERRED EMBODIMENT OF THE INVENTION

VoIP E-911 Solution Overview
  The solution is designed for
  VoIP service providers that supply enterprises with hosted PBX solutions
  VoIP service providers that supply enterprises with SIP trunks
  VoIP service providers that offer peer to peer voice communications (on-net)
  VoIP service providers that need to offer E911 service to roaming international users without a North American Numbering Plan (NANP).
  Enterprises with single or multiple onsite IP-PBXs
  Enterprises with digital VoIP gateways connected to legacy PBXs
  The solution routes 9-1-1 calls to the appropriate Public Safety Answering Point (PSAP) and provides the PSAP with the precise information of the origin of a 9-1-1 call. This information includes the phone's exact geographical location and direct callback number.
Compliance with FCC and NENA
  All enterprises that use VoIP telephony must have a 9-1-1 solution in place in order to comply with the FCC's mandate concerning emergency calling. The present invention is fully FCC compliant and follows all approved standards of NENA (The National Emergency Number Association). This ensures full interoperability with the PSAPs, Selective Routers and other infrastructure which makes up the existing emergency services network.

Key Features

Temporary Binding of a DID Number to a VoIP Endpoint

By temporarily assigning a DID to a VoIP endpoint during a 911 call, the present invention makes it possible for a PSAP to directly call back the phone in case of a dropped 9-1-1 call. This unique feature offers the following significant benefits:
- For enterprises, it ensures that dispatchers can quickly reach the person that made the emergency call without having to go through an intervening IVR system or receptionist.
- For enterprises, it eliminates the need to assign and manage emergency location identifier numbers (ELINs) to each phone.
- For users without a DID or not using a 10 digit North American Numbering Plan (NANP), a DID can be displayed at the PSAP control screen and used to call back the user.

Deployment Diagram

Figure 1:
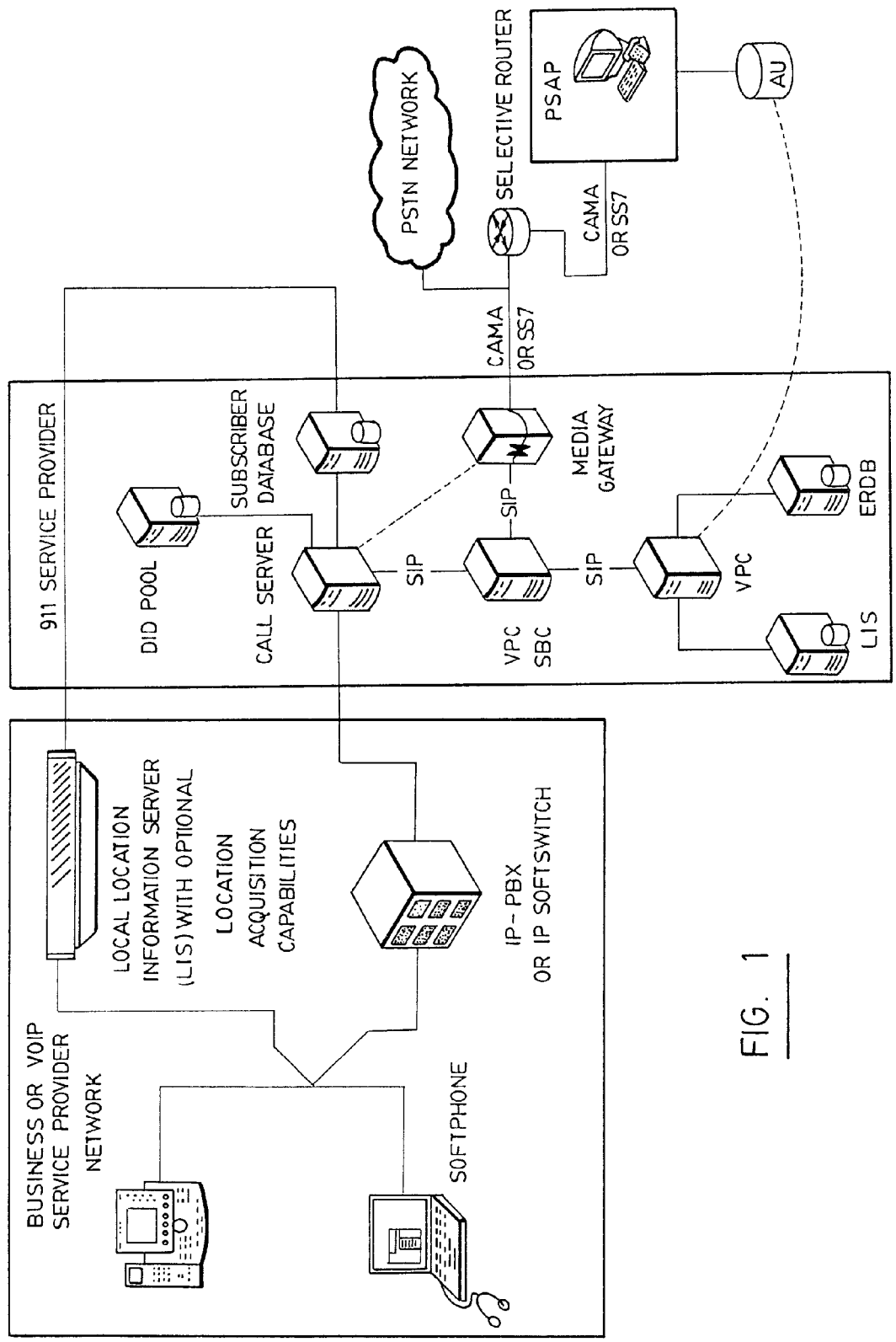
FIG. 1 is a schematic representation of a VoIP system according to one embodiment of the present invention.

The following sections describe generally the deployment diagram for the invention. FIG. 1 shows the various components of the system according to a preferred embodiment of the invention, and are described hereinafter.

IP Phone

The solution supports any type of IP phone. The phone's location must be pre-registered in the 911 Service provider database, or obtained from a local LIS. An IP phone is identified by a unique endpoint identifier. Examples of an endpoint identifier can be a phone number, an extension number, or a MAC address.

Softphone

A softphone is an IP phone running as software on a PC or handheld device. The phone's location must be pre-registered in the 911 Service provider database, or obtained from a local LIS. A softphone is identified by a unique endpoint identifier. Examples of an endpoint identifier can be a phone number, an extension number, or a MAC address.

Local Location Information Server (LIS)

A local LIS maintains the IP phone or softphone location information. Generally, the local LIS has location acquisition technology, such as crawling layer 2 switches to detect phones and their location. The local LIS is an optional component in the solution of the present invention.

IP-PBX or Softswitch

The IP-PBX or Softswitch is used to deliver the calls to the 911 service provider. The 911 calls can be delivered using standard VoIP protocols such as SIP and RTP. The equipment must deliver the caller's endpoint identifier, originating address (i.e. SIP address), and can optionally include a location object (PIDF-LO). The IP-PBX must be able to ring the caller's endpoint when the call is destined to the phone's address (i.e. ext 5150@acme.com must ring extension 5150).

Call Server

The 911 provider receives 911 calls on their call servers. Call servers are generally session border controllers (SBC) that support the VoIP protocols interfacing with the IP-PBX and softswitches. The call server is responsible to setup call. It obtains an available DID from the DID pool, looks up the customer location in the subscriber database, and routes the call to the VPC/Gateways using standard i2 call signaling.

DID Pool

The DID pool is a database of 10 digit NANP numbers from various markets. The pool is shared with all customers. When a 911 call is made, any free DID is assigned to the endpoint for a finite period before it is released back into the pool. The DID is assigned to the user populated in the ALI display as the callback number field. The DID pool maintains the associations of the DID to endpoints, allowing the call server to easily map from one to the other.

Subscriber Database

The subscriber database maintains the data related to emergency responder locations (ERL) and endpoints associated to these ERLs. The subscriber database is not used if the endpoint is able to deliver its location information in a location object (PIDF-LO). Generally, the subscriber database is updated either through a web interface, or by a local LIS.

VPC SBC

The VoIP Positioning Center (VPC) Session Border Controller (SBC) corresponds to the SIP proxy server described in the NENA i2 standard

VPC

The VoIP Positioning Center (VPC) performs the functions described in the NENA i2 standard

ERDB

The Emergency Routing Database (ERDB) performs the functions described in the NENA i2 standard

LIS

The Location Information Server (LIS) performs the functions described in the NENA i2 standard Media Gateway The Media Gateway interfaces between the IP and the PSTN networks. It performs the functions of an emergency services gateway (ESGW) described in the NENA i2 standard. The Media gateway also handles PSAP callbacks and routes them to the call server for processing.

Selective Router:

The selective router is managed by the Local Exchange Carrier (LEC) and is used to route 911 calls to the appropriate PSAP based on the Emergency Services Number (ESN).

PSAP

The Public Safety Answering Point (PSAP) is staffed by trained professionals to answer emergency 911 calls. The PSAP has access to an automatic location information database (ALI) to retrieve the caller's address and callback number.

ALI

The automatic location information database (ALI) contains a list of phone numbers and corresponding locations. For VoIP users, the ALI only holds a shell record that points to the VPC ALI-Link. When a 911 call is received the ALI queries the VPC to obtain a caller's record.

1. Overview

The solution according to an embodiment of the present invention is applicable in the following cases:
- VoIP service providers that supply enterprises with hosted IP-PBX solutions
- VoIP service providers that supply enterprises with SIP trunks
- Enterprises with single or multiple onsite IP-PBXs
- Peer to Peer VoIP Service providers that do not assign DIDs to each account.
- VoIP Service providers that offer service to international users without assigning them to a North American Numbering plan.

An enterprise customer is defined as an entity that uses a VoIP PBX and requires E911 service for each of their extensions. Some enterprise customers will only have one office location. Others will have multiple office locations. In many cases, these extensions will not have DIDs assigned to them.

A VoIP service provider (VSP) is defines as an entity that provides VoIP calling service and requires E911 service for each customer.

Enhanced 911 services are provided by routing 9-1-1 calls using the NENA i2 standard to the appropriate Public Safety Answering Point (PSAP). This method provides the PSAP of the caller's precise location and callback number during the call setup. This information includes the phone exact geographical location and callback number.

Without the present invention, the PSAP is unable to call the distressed caller if it does not have a callback number. MTLS solutions offer certain workarounds to do this:

- Some MTLS systems map phone extensions to a main number. However, the callback number rings the company IVR or receptionist, wasting valuable time for the dispatchers trying to reach the person that made the emergency call.
- Some MTLS systems map Emergency Location Identification Numbers (ELINs) to each location, This is done by assigning a permanent DID for each emergency responder location (ERL) such as a floor, wing, or suite. This requires the MTLS administrator to purchase DIDs for each location and ensure that the system maps the extension to the correct DID based on the caller's location. This is highly impractical for MTLS systems that have users in many dispersed locations, particularly for work at home employees, and traveling workers.

By temporarily binding a DID to an VoIP phone during a 911 call, the invention makes it possible for a PSAP to directly call back the extension in case of a dropped 9-1-1 call while reducing costs and administration efforts. This is possible even though the extension does not have a permanently bound DID.

2. Configuration

This section describes the configuration parameters required to enable this feature, according to an embodiment of the present invention.

2.1 Emergency Responder Location

A caller's Emergency Responder Location (ERL) must be provisioned in a location identifier server (LIS). The ERL data consists of a valid civic address that can be matched to a PSAP Master Street Address Guide (MSAG) record and additional location information such as floor, suite, cubicle data. An ERL is identified and indexed by the Location Key (LK).

2.2 SIP URI Mapping Table

Each enterprise extension is associated to a location. This grouping is configured in the softswitch. The softswitch has a SIP URI mapping table that can remap the phone's SIP URI to the SIP URI of the location key (LK) for 9-1-1 calls. SIP URIs are unique across the system.

2.3 E911 DID Pool

The softswitch is configured with a list of DIDs that can be dynamically bound to a SIP URIs during the 911 call setup process. These DIDs must be obtained from a local carrier, but can be shared among a large number of users since the occurrence of 911 calls is very low.

2.4 911 Call Rules

Each trunk (or resource) must be configured with rules that allow it to process 9-1-1 calls.

The rule will normally be applied to calls that dial 9-1-1 and arrive from IP addresses that are registered as 911 Enable clients.

If the call matches the 9-1-1 rule, the following actions must be taken:

- Bind a DID from the E911 DID Pool to the SIP URI (if not already bound to a DID.)
- Insert the corresponding DID in the P-Asserted-Identity as a TEL URI.
- Remap the caller's SIP URI to a location key (LK)

For example, a 9-1-1 call from SIP URI 02123456john@company X is placed. The 911 call rule will bound to +12121234567, put the DID in the P-Asserted-Identity and replace the SIP URI with locationx@911provider.com.

2.5 DID Binding Duration

The DID binding duration is configurable for each trunk. The default value with be 48 hours.

3. Sequence Diagrams

3.1 Normal E-911 Call Scenario with Emergency Callback

Figure 2B:
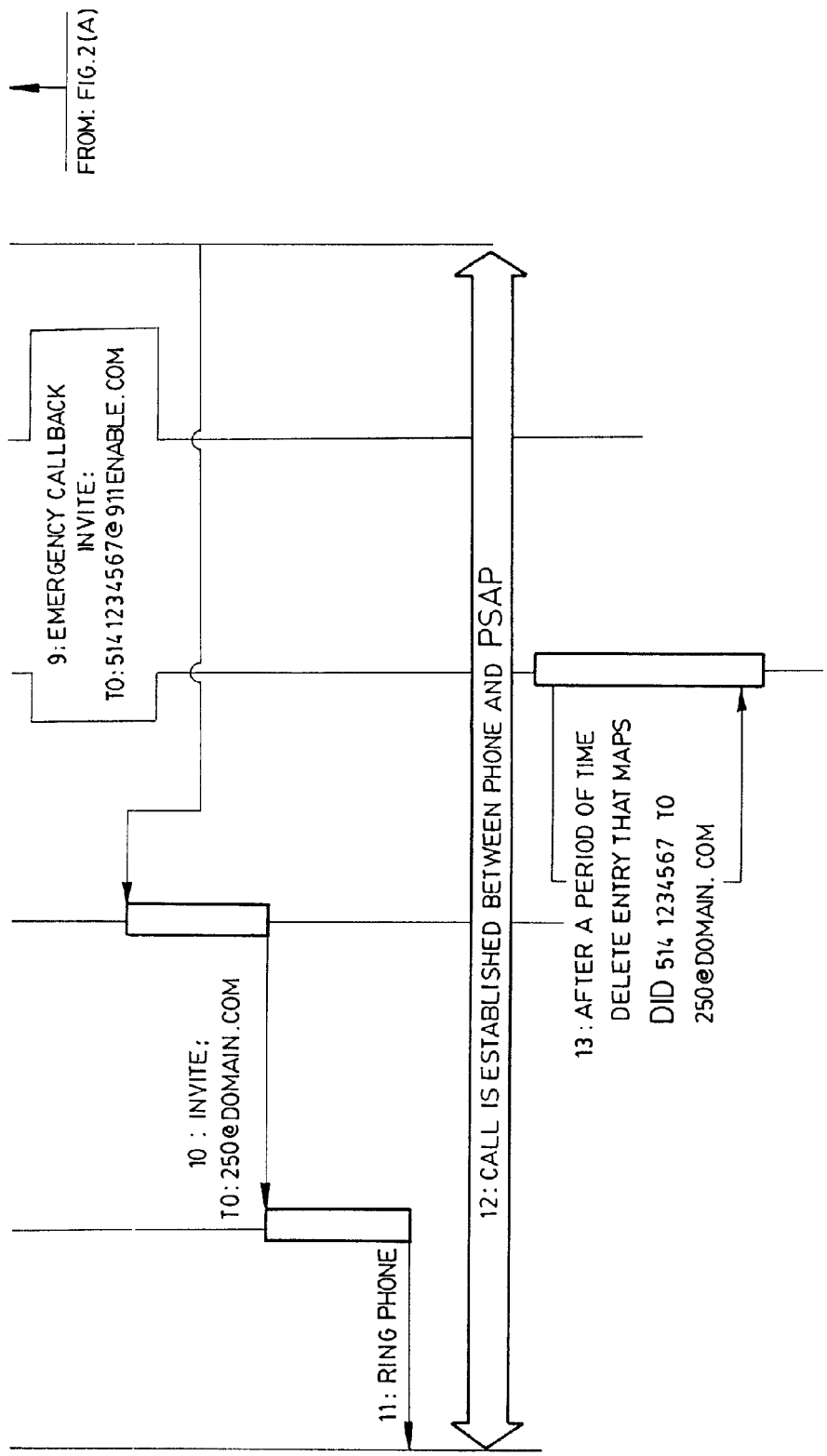
FIG. 2 is a sequence diagram of a 911 call, according to a preferred embodiment of the invention.

A normal E-911 call scenario with Emergency Callback is illustrated in FIG. 2, and follows the sequence outlined below.

| Sequence Number | Description |
| --- | --- |
| 1 | The phone with an endpoint identifier of 250 (i.e. extension 250) makes a 911 call. |
| 2 | The IP-PBX/Softswitch is configured to forward the call to the 911 Call Server. The softswitch converts the call to the appropriate protocol (i.e. SIP/RTP) and sets the SIP URI from field to 250@domain.com |
| 3 | 911Enable session controller receives the call and requests an available DID from the DID Pool Database. |
| 4 | DID Pool Database returns an available DID that is not bound to another user. |
| 5 | 911 Call Server inserts the dynamically assigned DID in the P-Asserted-Identity field as a TEL URI, and remaps the FROM SIP URI from the endpoint address, to the caller's location key locationa@911enable.com. The call is forwarded to the NENA i2 infrastructure A person skilled in the art will readily recognize that the NENA interim 2 standard for detailed call flows between the various components is applicable. |
| 6 | The call is forwarded to the appropriate PSAP using NENA i2 call signaling. PSAP queries the ALI database to retrieve receives the subscriber information and the callback number to call the extension directly. The callback number is the dynamically assigned DID from the DID pool. |
| 7 | Voice communication is established. |
| 8 | Call hangs up normally using standard SIP signaling. |
| 9 | PSAP attempts to callback the user based on the callback number provided in the original call (5141234567). Carrier forwards call to the 911 call server. |
| 10 | The 911 Call Server remaps the dynamic DID (5141234567) to the endpoint's SIP address. |
| 11 | The IP-PBX/Sofswitch uses the endpoint's SIP address to forward the call to the appropriate phone. |
| 12 | Call is re-established between the 9-1-1 caller extension and the PSAP. When the conversation is completed, the call hangs up normally using standard SIP signaling. |
| 13 | After the configured binding time, the DID is released and put back into the pool of available DIDs |

3.2 E911 Call Made from the Same Extension in 48 Hours

Since the SIP URI is already bound to the DID, the DID will be reused for the call and the 48 hour timer is reset. Otherwise this case is handled exactly the same way as described in sequence 3.1 Normal E-911 call scenario with Emergency Callback The following is a list of acronyms used in the description of the present invention, and are reproduced for the reader's convenience, although persons skilled in the art will recognize the significance of these acronyms.

Acronyms:

DID

Direct Inward Dialing: The number assigned to a VoIP user that allows that user to connect to the old PSTN Networks around the world.

E911

Enhanced 911: E911 services connect VoIP services to the existing 911 infrastructure. This allows for a VoIP emergency call to provide the same emergency-relevant location information that traditional telephony provides.

PSTN

Public Switched Telephone Network: The world's public circuit-switched telephone networks. The PSTN is largely governed by technical standards created by the International Telecommunication Union.

SIP

Session Initiation Protocol: A protocol and standard for initiating, modifying, and terminating a multimedia (voice, video, etc) interactive session. SIP was accepted in 2000 as the 3GPP signaling element and a permanent element of IMS architecture.

URI (Uniform Resource Identifier) The address of an Internet resource. A URI is the unique name used to access the resource. It is not necessarily a specific file location (it may be a call to an application or a database, for example), which is why it is preferred over the similar acronym URL (Uniform Resource Locator).

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A method for delivering callback numbers for emergency calls in a VoIP system comprising a VoIP network, said VoIP network comprising a VoIP switch, the method comprising the steps of:
   (a) providing a pool of callback numbers consisting of a plurality of individual DIDs;
   (b) providing a plurality of VoIP phones in the VoIP network, each phone being provided with a unique SIP URI and being serviced by said VoIP switch and capable of registration with said VoIP switch;
   (c) assessing when an emergency call is made by one of said VoIP phones;
   (d) at an emergency service provider system located outside of the VoIP network and communicating with said VoIP network via said VoIP switch, receiving said SIP URI from VoIP switch and temporarily binding a DID to said SIP URI for a predetermined amount of time when the emergency call is made from at least one of said phones if said SIP URI is not already bound to a DID, wherein said binding is performed outside of and independently of said VoIP network; and
   (e) marking said DID that is bound to said SIP URI as unavailable, wherein said marking is performed outside of said VoIP network.

2. A method according to claim 1, wherein said DID is bound to said SIP URI for up to 48 hours, and is subsequently marked as available in said pool of callback numbers.

3. A method according to claim 1, wherein said emergency service provider system is a 911 service provider system.

4. A method for delivering callback numbers for emergency calls in a VoIP system comprising a VoIP network, said VoIP network comprising a VoIP switch, the method comprising:
   assessing when an emergency call is made by one of a plurality of VoIP phones in said VoIP network, each VoIP phone being serviced by said VoIP switch and capable of registration with said VoIP switch;
   temporarily assigning, for a predetermined amount of time, a DID from a pool of DIDs to the one of said VoIP phones in the VoIP network during the emergency call, said DID mapping a callback number to the one of the VoIP phones in the VoIP network, wherein the pool of DIDs is provided by an emergency service provider system located outside of the VoIP network and communicating with said VoIP network via said VoIP switch, and the assigning is performed outside of and independently of the VoIP network; and
   marking said DID that is bound to said one of the VoIP phones as unavailable, wherein said marking is performed outside of said VoIP network.

5. An emergency service provider system for delivering callback numbers for emergency calls in a VoIP system comprising a VoIP network, said VoIP network comprising a VoIP switch, the emergency service provider system being located outside of the VoIP network and communicating with the VoIP network via said VoIP switch, the emergency service provider system comprising:
   a call server for connection to said VoIP switch of the VoIP network;
   a subscriber database;
   a VoIP Positioning Center (VPC) Session Border Controller (SBC); and
   a media gateway for connection to a PSTN;
   said call server being adapted to:
   receive and assess when an emergency call from a VoIP phone serviced by and capable of registration with said VoIP switch in said VoIP network, said VoIP phone being provided with a unique SIP URI;
   receive the SIP URI from said VoIP switch;
   verify if the SIP URI has a DID bound to said SIP URI;
   if the SIP URI does not have a DID bound to said SIP URI, obtain a temporary DID from a DID pool, temporarily bind said temporary DID to said SIP URI for a predetermined amount of time, wherein said temporary DID is bound to said SIP URI outside of the VoIP network, and mark said temporary DID that is bound to said SIP URI as unavailable, wherein said marking is performed outside of and independently of said VoIP network; and
   forward the call to an appropriate PSAP in said PSTN.

6. An emergency service provider system according to claim 5, wherein said emergency service provider system is a 911 service provider system.

7. An emergency service provider system according to claim 5, wherein said temporary DID is bound to said SIP URI for a period of up to 48 hours.

8. A VoIP system comprising:
   a VoIP network, said VoIP network including a VoIP switch and a plurality of VoIP phones serviced by said VoIP switch and capable of registration with said VoIP switch, each of the plurality of VoIP phones being provided with a unique SIP URI;
   an emergency service provider system located outside of the VoIP network and communicating with the VoIP network via said VoIP switch, said emergency service provider system including:

a call server for connection to said VoIP switch of said VoIP network;
a subscriber database;
a VoIP Positioning Center (VPC) Session Border Controller (SBC); and
a media gateway for connection to a PSTN;
said call server being adapted to:
receive and assess when an emergency call from a VoIP phone in said VoIP network;
receive the SIP URI from said VoIP switch;
verify if the SIP URI has a DID bound to said SIP URI;
if the SIP URI does not have a DID bound to said SIP URI, obtain a temporary DID from a DID pool, and temporarily bind said temporary DID to said SIP URI for a predetermined amount of time, wherein said temporary DID is bound to said SIP URI outside of and independently of the VoIP network, and mark said temporary DID that is bound to said SIP URI as unavailable, wherein said marking is performed outside of said VoIP network; and
forward the call to an appropriate PSAP in said PSTN.

9. A system according to claim 8, wherein at least one of said plurality of VoIP phones is a softphone.

* * * * *